United States Patent
Beljambe et al.

(10) Patent No.: US 10,322,813 B2
(45) Date of Patent: Jun. 18, 2019

(54) CASING STRUCTURE INTERPOSED BETWEEN THE ENGINE AND THE NACELLE HAVING PIVOTING SHROUD SECTORS

(71) Applicant: SAFRAN AIRCRAFT ENGINES, Paris (FR)

(72) Inventors: Ceddric Beljambe, Soignolles en Brie (FR); Noel Robin, Villejust (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 505 days.

(21) Appl. No.: 14/915,315

(22) PCT Filed: Aug. 25, 2014

(86) PCT No.: PCT/FR2014/052121
§ 371 (c)(1),
(2) Date: Feb. 29, 2016

(87) PCT Pub. No.: WO2015/033042
PCT Pub. Date: Mar. 12, 2015

(65) Prior Publication Data
US 2016/0214729 A1    Jul. 28, 2016

(30) Foreign Application Priority Data
Sep. 4, 2013 (FR) ...................... 13 58478

(51) Int. Cl.
*F01D 9/02* (2006.01)
*B64D 27/26* (2006.01)
(Continued)

(52) U.S. Cl.
CPC ............. *B64D 29/06* (2013.01); *B64D 27/26* (2013.01); *F01D 9/02* (2013.01); *F01D 25/243* (2013.01);
(Continued)

(58) Field of Classification Search
CPC ...... F01D 25/24; F01D 25/243; F01D 25/246; F01D 25/14; F01D 25/28; B64D 29/06;
(Continued)

(56) References Cited

U.S. PATENT DOCUMENTS 2,494,347 A * 1/1950 Matthews ............. B64D 29/08
16/260
3,571,977 A * 3/1971 Abeel ................... B64C 1/1446
244/129.5
(Continued)

FOREIGN PATENT DOCUMENTS

EP    1 741 879 A1    1/2007
EP    1 998 012 A2    12/2008
(Continued)

OTHER PUBLICATIONS

International Search Report dated Nov. 24, 2014 in PCT/FR2014/052121 filed Aug. 25, 2014.

*Primary Examiner* — Ninh H. Nguyen
*Assistant Examiner* — Brian P Wolcott
(74) *Attorney, Agent, or Firm* — Oblon, McClelland, Maier & Neustadt, L.L.P.

(57) ABSTRACT

A casing structure interposed between the engine and the nacelle of an aircraft, the structure including a shroud surrounding the engine having an engine axis and including a stationary portion and a plurality of sectors; a radial arm providing the connection to the nacelle; fasteners for securing the plurality of shroud sectors to one another or to the radial arm; and the fasteners include two series of holes formed in two parallel side walls of the shroud sectors for the purpose of receiving two respective series of bolts, each passing through a corresponding set of orifices of an adjacent shroud sector or of an adjacent radial arm, a hinge arranged between each of the shroud sectors and the stationary portion of the shroud to enable the shroud sectors to
(Continued)

be pivoted in individual manner about a common pivot axis perpendicular to the side walls arranged along the engine axis.

5 Claims, 2 Drawing Sheets

(51) Int. Cl.
 *B64D 29/06* (2006.01)
 *F01D 25/24* (2006.01)
(52) U.S. Cl.
 CPC ...... *F01D 25/246* (2013.01); *B64D 2027/262* (2013.01); *F05D 2220/323* (2013.01); *F05D 2260/30* (2013.01)
(58) Field of Classification Search
 CPC ..... B64D 29/08; B64D 27/26; F05D 2230/72; F05D 2260/02
 See application file for complete search history.

(56) References Cited

U.S. PATENT DOCUMENTS

| | | | |
|---|---|---|---|
| 7,090,165 B2* | 8/2006 | Jones | B64D 29/08 |
| | | | 244/53 R |
| 7,430,852 B2* | 10/2008 | Beutin | F02C 7/20 |
| | | | 239/265.39 |
| 7,805,949 B2* | 10/2010 | Mazeaud | F02K 3/04 |
| | | | 244/129.4 |
| 2007/0084216 A1 | 4/2007 | Mazeaud et al. | |
| 2009/0129922 A1 | 5/2009 | Cloft et al. | |
| 2011/0142608 A1 | 6/2011 | Derenes et al. | |
| 2011/0168837 A1 | 7/2011 | Balk et al. | |
| 2011/0297787 A1 | 12/2011 | Guillaume et al. | |
| 2013/0125560 A1 | 5/2013 | Bellabal | |

FOREIGN PATENT DOCUMENTS

| | | |
|---|---|---|
| EP | 2 392 509 A1 | 12/2011 |
| FR | 2 953 810 A1 | 6/2011 |
| WO | 2010/007226 A2 | 1/2010 |
| WO | 2012/013889 A1 | 2/2012 |

* cited by examiner

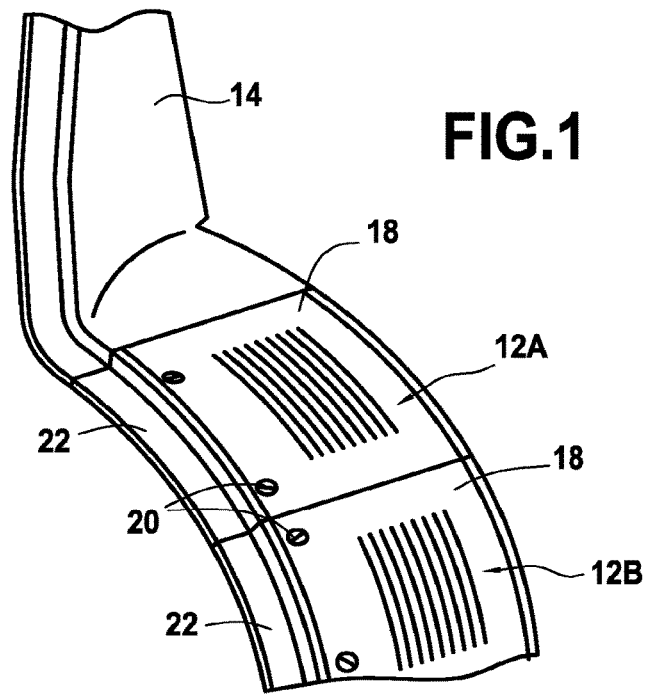
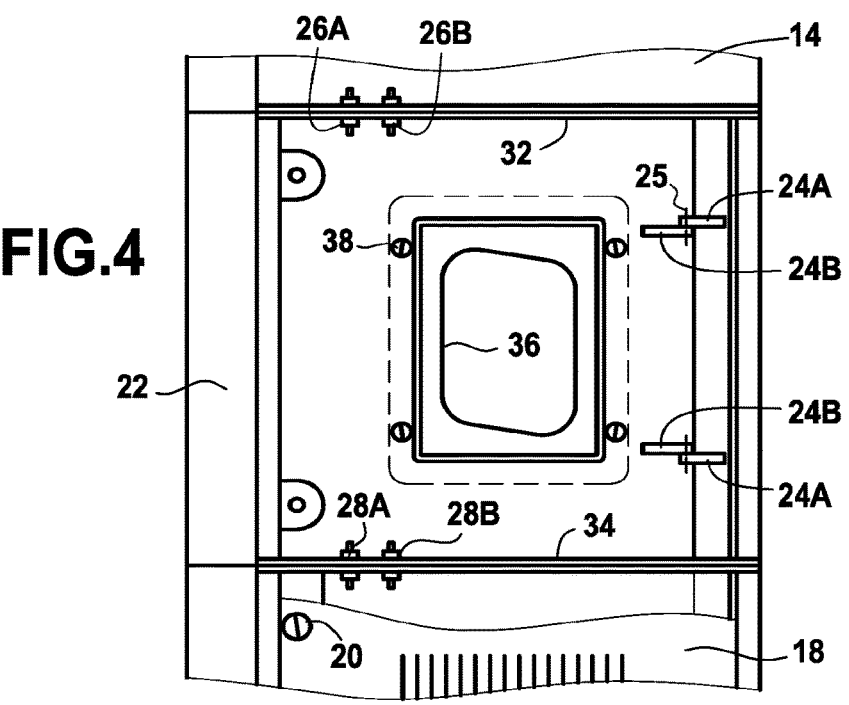

CASING STRUCTURE INTERPOSED BETWEEN THE ENGINE AND THE NACELLE HAVING PIVOTING SHROUD SECTORS

BACKGROUND OF THE INVENTION

The present invention relates to the field of aircraft engines, for example turbojets, and it relates more particularly to a casing structure interposed between the engine and the nacelle.

In known manner, in addition to providing the mechanical junction between the engine and the nacelle, such a structure must:

provide continuity of the aerodynamic passage for the bypass stream;
pass and hold (electrical, mechanical, hydraulic) services between the various components of the engine (core, fan, etc.) and the nacelle of the engine;
provide fireproofing protection between the various compartments of the engine and the bypass stream; and
provide accessibility to pieces of equipment and to services for maintenance purposes.

The casing structure is made up both of a sectorized cylindrical frame (or of shroud sectors) of small width (of the order of a few hundreds of millimeters around the axis of the engine) suitable for giving easy access on opening the nacelle to the pieces of equipment that it covers (e.g. the thrust take-up rods, or indeed various actuators for actuating services), and also of at least one radial arm arranged around the frame. Conventionally, the frame also supports scoops of the air bleed system (variable bleed valve (VBV) booster).

Since the time required for maintenance needs to be optimized, the frame thus constitutes an obstacle to accessing pieces of equipment placed beneath it, to enable them to be removed, changed, or verified . . . , on apron and on opening the nacelle in time that is limited and depends on the application, and that needs to take account of the time required for removing and replacing the frame itself.

There thus exists a need for a casing structure that provides easy access to these pieces of equipment (i.e. access that is compatible with the time authorized for maintenance on the ground), while enabling all of the above-mentioned functions to be performed and in particular while ensuring reduced disturbance in the air flow passage.

OBJECT AND SUMMERY OF THE INVENTION

A main object of the present invention is thus to mitigate such drawbacks by proposing a casing structure interposed between the engine and the nacelle of an aircraft, the structure comprising:

a shroud surrounding the engine having an engine axis and comprising a stationary portion and a plurality of sectors;
at least one radial arm providing the connection to the nacelle; and
a plurality of fastener means for securing said plurality of shroud sectors to one another or to said at least one radial arm;
the structure being characterized in that said plurality of fastener means comprise two series of holes formed in two parallel side walls of said shroud sectors for the purpose of receiving two respective series of bolts, each passing through a corresponding set of orifices of an adjacent shroud sector or of an adjacent radial arm, a hinge also being arranged between each of said shroud sectors and said stationary portion of said shroud in order to enable each of said shroud sectors to be pivoted in individual manner about a common pivot axis perpendicular to said side walls arranged along said engine axis.

Thus, the hinging of each shroud sector about a pivot axis enables a given sector to be "retracted" easily and quickly independently of neighboring sectors in order to access equipment or services covered by that sector, and to do so without any need during servicing to store the open sector, since it is held by the shroud.

Preferably, said hinge is formed by two arms, one secured to said shroud sector body and the other to said stationary shroud portion, said two arms being connected by said common pivot axis enabling the hinge to pivot perpendicularly to said engine axis.

Advantageously, each of said shroud sectors is covered by a cap that is fastened on a body of said shroud sector by headed bolts, said cap including orifices with chamfers at their inlets to fit against the heads of said headed bolts and thus enable them to be mounted flush.

Preferably, said shroud sector body includes an opening acting as a scoop for receiving an air discharge duct.

The invention also provides an aeroengine including a casing structure as specified above.

BRIEF DESCRIPTION OF THE DRAWINGS

Other characteristics and advantages of the present invention appear from the following description made with reference to the accompanying drawings, which show an implementation having no limiting character. In the figures:

FIG. 1 is an outside perspective view of a casing structure interposed between the engine and the nacelle in accordance with the invention;

FIG. 4 is a plan view of the FIG. 1 casing structure, the cap of a shroud sector being removed.

DETAILED DESCRIPTION OF AN EMBODIMENT

Figure 2:
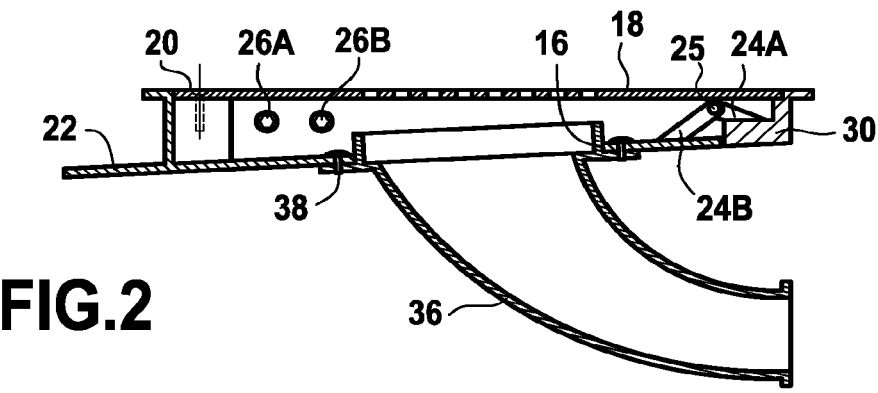
FIG. 2 is a section view of FIG. 1 through a shroud sector.

FIGS. 1 and 2 show, respectively in perspective and in section, a portion of the casing structure interposed between the engine and the nacelle of an aircraft, typically a turbojet, that is present in the form of a sectorized shroud (with only two sectors 12A and 12B being shown) that is connected by at least one radial casing support arm of the nacelle (e.g. the radial arm 14). Depending on the circumference of the engine, on the positions of pieces of equipment such as the thrust take-up rods, and on the actuators for actuating the VBVs or variable stator vanes (VSVs), for example, the shroud may comprise up to eight adjacent sectors that are separable from one another and that are mounted between a plurality of regularly distributed radial arms. Each shroud sector is pierced by openings 16 acting as scoops for one of the air discharge systems of the engine (e.g. the variable bleed valve or VBV system).

Each shroud sector has an outer cap 18 fastened by headed bolts 20 passing through the body 22 of the shroud sectors. The orifices in the cap advantageously have chamfered inlets so as to fit against the heads of the headed bolts and thus enable them to be mounted flush, such that the head of each bolt becomes positioned exactly therein. The head is then in alignment with the top face of the covering in contact with the bypass air stream and therefore does not constitute an obstacle to the bypass air stream, whose aerodynamic continuity is thus ensured.

Figure 3:
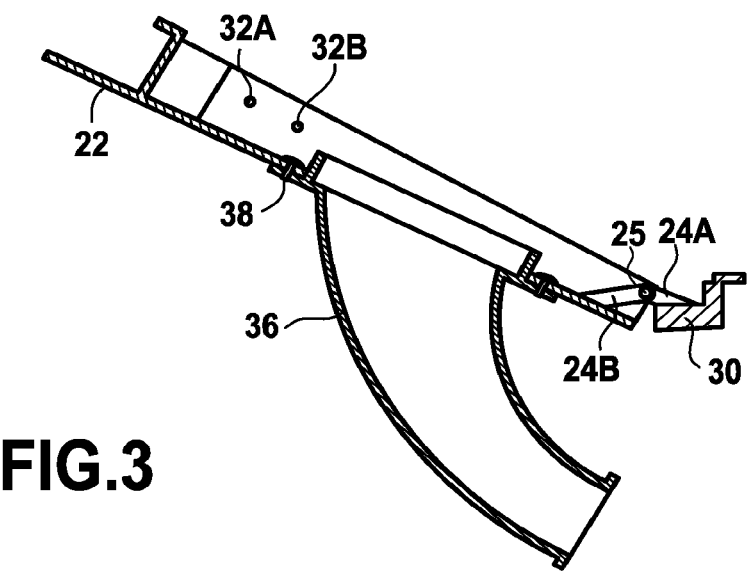
FIG. 3 is a section view similar to that of FIG. 2, the shroud sector being tilted to give access to the equipment.

According to the invention, and as shown more particularly in FIGS. 3 and 4, the shroud sectors are secured to one another or to radial arms by fastener means comprising two series of holes formed in two parallel side walls 32 and 34 of the shroud sectors for the purpose of receiving respectively two series of bolts 26A, 26B; 28A, 28B each passing through a corresponding set of orifices 32A, 32B of an adjacent shroud sector or of an adjacent radial arm in order to hold them respectively together, a hinge having arms 24A, 24B also being arranged between each of these shroud sectors and a stationary portion 30 of the connection (e.g. a remaining shroud portion) so that once the bolts have been removed, each of the shroud sectors can pivot individually about a common pivot axis 25 perpendicular to said side walls, i.e. tangential to a central line of the outside surface of the shroud sector.

The plurality of bolts are for passing through a plurality of holes formed in the two side walls of each shroud sector. By way of example, the two bolts 26A and 26B pass through two holes 32A and 32B in the side wall 32 of the shroud sector 12A and are received in the side wall of the adjacent radial arm 14. Naturally, the number of bolts is given purely by way of indication, the connection with the side walls necessarily having at least two bolts in order to provide redundancy. Nevertheless, the number of bolts should be limited since too many bolts would be penalizing in terms of tightening and loosening operations during maintenance. In addition, since the bolts contribute to annularly shaping the set of shroud sectors, they necessarily take up numerous forces and therefore need to be strong enough to provide a connection that is rigid.

The hinge arms 24A and 24B comprise one secured to the body 22 of the shroud sector and the other to the stationary portion 30 of the shroud, these two arms being connected together by a common pivot axis 25 enabling the hinge to pivot. The hinge may be a single hinge, in which case it is positioned centrally, or there may be two hinges on either side of a central axis of the sector, as shown, or indeed there may be multiple hinges, which are regularly distributed along the upstream wall of the shroud sector (upstream relative to the flow direction of the bypass air stream). An abutment (not shown) may be provided to limit pivoting when a shroud sector is opened, with alignment on closure with the adjacent sectors being obtained by way of example, and as shown in FIG. 3, by the sector body 22 coming into contact with the stationary portion 30. It should also be observed that there is an air discharge duct 36 for the scoop that is fastened by means of bolts 38 in the opening 16 of the sector body.

Thus, by being able to pivot a shroud sector by virtue of its hinge, once the bolts connecting it to the adjacent sectors have been removed, it is possible during a maintenance operation on equipment under this sector (e.g. periodically inspecting the thrust take-up rods) to have quick and easy access to the equipment, while leaving untouched the adjacent shroud sectors and avoiding any need to provide temporary storage for the sector (which can lead to a sector being damaged or lost).

The invention claimed is:

1. A casing structure fitted for providing a mechanical junction between an engine and a nacelle of an aircraft, the casing structure comprising:
   a shroud configured to surround the engine having an engine axis and comprising a stationary portion and a plurality of shroud sectors;
   at least one radial arm arranged around said shroud and configured to provide the connection with the nacelle; and
   a plurality of fasteners for securing said plurality of shroud sectors to one another or to said at least one radial arm, said plurality of fasteners comprising two series of orifices formed in two parallel side walls of said plurality of shroud sectors, said two parallel side walls being arranged along an axis of said engine, the two series of orifices being configured to receive two respective series of bolts, each bolt passing through a corresponding set of orifices of adjacent shroud sectors of said plurality of shroud sectors or of a shroud sector of said plurality of shroud sectors and an adjacent radial arm, wherein a hinge is arranged between each of said shroud sectors and said stationary portion of said shroud in order to enable each of said shroud sectors to be pivoted in an individual manner about a pivot axis perpendicular to said two parallel side walls.

2. The casing structure according to claim 1, wherein each hinge is formed by two arms, one secured to a shroud sector body and the other to said stationary shroud portion, said two arms being connected by said pivot axis enabling the hinge to pivot perpendicularly to said engine axis.

3. The casing structure according to claim 1, wherein each of said shroud sectors is covered by a cap that is fastened on a body of each shroud sector by headed bolts, each cap including orifices with inlets, and having chamfers at the inlets to fit against the heads of said headed bolts to provide a flush mount for each headed bolt.

4. The casing structure according to claim 3, wherein a shroud sector body includes an opening acting as a scoop for receiving an air discharge duct.

5. An aeroengine including the casing structure according to claim 1.

* * * * *